Dec. 20, 1966    RYUTARO MORI ETAL    3,293,457
BRUSHLESS D.C. MOTOR PROVIDED WITH HALL-EFFECT DEVICES
Filed Sept. 25, 1963
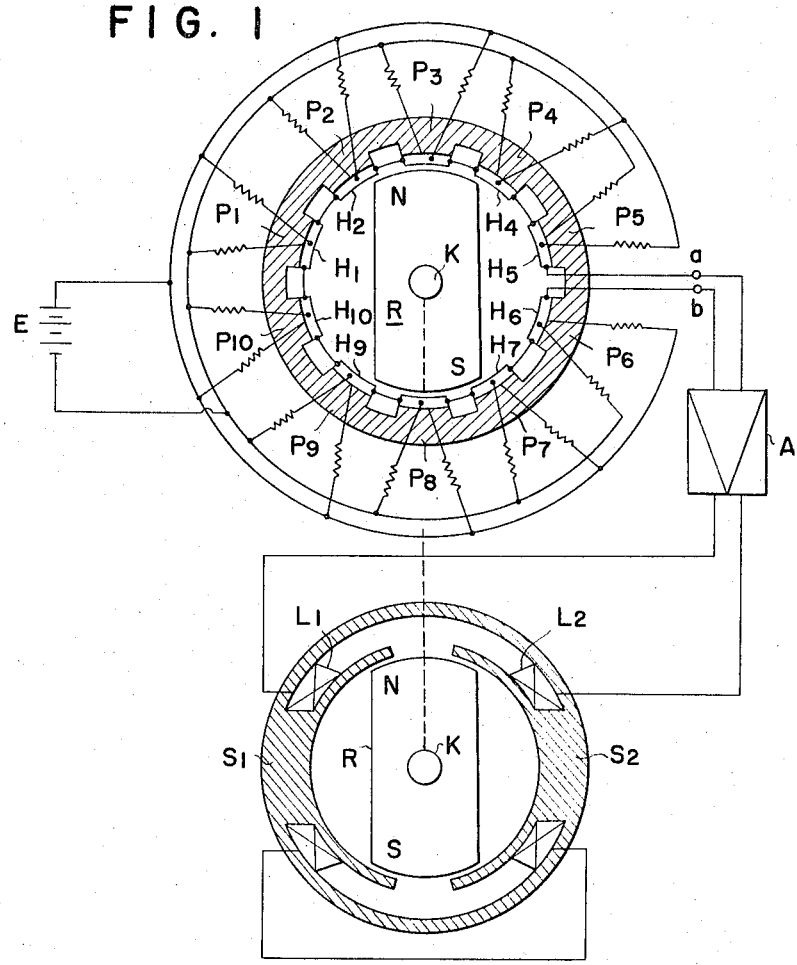
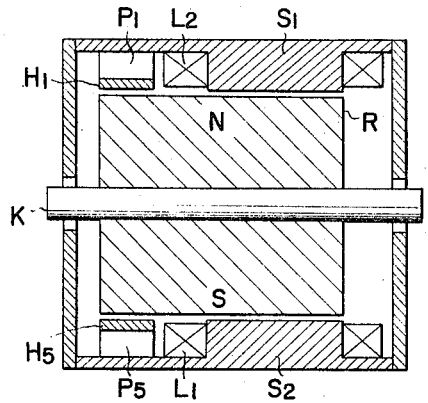

3,293,457
BRUSHLESS D.C. MOTOR PROVIDED WITH HALL-EFFECT DEVICES

Ryutaro Mori and Toshio Numakura, Kodaira-shi, Tamio Uemura, Hitachi-shi, and Yoshiya Miyamoto, Sendai-shi, Japan, assignors to Kabushiki Kaisha Hitachi Seisakusho, Tokyo-to, Japan, a joint-stock company of Japan
Filed Sept. 25, 1963, Ser. No. 311,471
Claims priority, application Japan, Sept. 28, 1962, 37/55,475
1 Claim. (Cl. 310—10)

The present invention relates to brushless direct-current motors, and more particularly it relates to a new brushless D.C. motor wherein the rotational position of the rotor is detected by a large number of Hall-effect devices (hereinafter referred to as Hall generators), and the magnetization of the stator poles is controlled in accordance with the detected signal.

Heretofore, brushless motors wherein permanent magnets are used in the rotors, and their fluxes are detected by means of Hall generators have been known. In the arrangement of such a motor, in general, a Hall generator is disposed on each surface of the stator core, and the output voltage of each Hall generator is amplified to supply magnetizing current to the corresponding driving coil. In a motor of such an arrangement, an amplifier is necessary for each Hall generator. Therefore, when a large number of Hall generators are used, the construction of the motor becomes inconveniently complicated.

It is a general object of the present invention to overcome the above-stated difficulty.

More specifically, it is an object to provide a brushless D.C. motor, having a relatively simple circuit wherein a large number of Hall generators of relatively small size are used, and the number of amplifiers is reduced by combining the outputs of the Hall generators.

The foregoing objects have been achieved by the present invention, the nature and details of which will be best understood by reference to the following description of a preferred embodiment of the invention, taken in conjunction with the accompanying drawing in which like parts are designated by like reference numerals, and in which:

FIGURE 1 is a schematic diagram, partly as a cross-sectional view, of the embodiment; and FIGURE 2 is a longitudinal sectional view of the embodiment.

Referring to the drawing, the driving side of the motor shown comprises a rotor R consisting of a permanent magnet mounted on a shaft K, stator poles $S_1$ and $S_2$ for driving which encompass the rotor R, and driving coils $L_1$ and $L_2$ wound about the stator poles $S_1$ and $S_2$.

On its control side, the motor is provided with a stator core which has salient parts $P_1$, $P_2$, $P_3$, . . . $P_{10}$ Hall generators $H_1$, $H_2$, $H_3$, . . . $H_{10}$ attached to the surfaces of respective salient parts, a power supply source E for the Hall generators, and a push-pull amplifier A for amplifying the electromotive force generated in the Hall generators and supplying driving current to the aforesaid driving coils $L_1$ and $L_2$.

The arrangement in the axial direction of the parts disposed within the motor may be seen in FIGURE 2, which shows a longitudinal section taken through the rotor axis in the N–S direction of the rotor R which is in a rotational position displaced 90 degrees from that shown in FIGURE 1. Referring again to FIGURE 1, the output side of the ten Hall generators attached to the stator poles for control $P_1$ to $P_{10}$ are series-connected in regular succession in such arrangement that the outputs of the various Hall generators are additive. More specifically, the ten Hall generators are divided into two groups ($H_1$ through $H_5$ and $H_6$ through $H_{10}$) and are so connected that the output generated by the generators in one group are added in the same direction to the output generated by the generators in the other group. By this arrangement of Hall generators, one cycle of alternating voltage is generated by one revolution of the rotor R between the combined output terminals $a$ and $b$. This alternating voltage is amplified by the amplifier A and magnetizes the driving coils $L_1$ and $L_2$ alternately positively and negatively.

When the rotor R is in a certain rotational position, for example, the position indicated in FIGURE 1, a Hall electromotive force is generated in each of the Hall generators $H_3$ and $H_8$. The combined voltage so created is transmitted by way of the other Hall generators to the terminals $a$ and $b$. If, as an assumption, the voltage between these terminals $a$ and $b$ is positive, this positive voltage will be amplified by the amplifier A and will energize the driving coils $L_1$ and $L_2$, whereby the stator poles $S_1$ and $S_2$ will respectively be magnetized as the N-pole and the S-pole. Consequently, the rotor R will rotate in the clockwise direction.

When the rotor R has been rotated clockwisely by the above-described operation and reaches an angular position 90 degrees from the position shown in FIGURE 1, the voltage between the terminals $a$ and $b$ becomes zero, but the rotor R continues its rotation under its momentum. While the flux from the N-pole of the rotor R is acting upon the Hall generators $H_6$ through $H_{10}$, a negative voltage is generated between the terminals $a$ and $b$ and, after being amplified, energizes the driving coils $L_1$ and $L_2$ in the direction opposite to that described above. Accordingly, the rotor R again receives a clockwise torque and thereby continues its clockwise rotation.

For the amplifier A, a circuit composed of components such as, for example, transistors, is suitable. In the case when energizing current in both positive and negative directions cannot be supplied in a simple manner to the coils $L_1$ and $L_2$ constituting the load, the circuit can be simplified by dividing each of the coils $L_1$ and $L_2$ into two coils and using one of the divided coils for the positive direction and the other for the negative direction.

In the motor of the above-described construction according to the present invention, a large number of Hall generators is used, but the number of amplifiers can be reduced by combining the outputs of the Hall generators. Furthermore, the motor of this invention has other advantages and practical features such as the fact that Hall generators of large size are not necessary.

It is to be observed that the composition of the rotor R is not limited to a permanent magnet, but may be an electromagnet supplied with direct current from an outside source.

It should be understood, of course, that the foregoing disclosure relates to only a preferred embodiment of the invention and that it is intended to cover all changes and modifications of the example of the invention herein chosen for the purposes of the disclosure, which do not constitute departures from the spirit and scope of the invention as set forth in the appended claim.

What is claimed is:

An electric motor utilizing Hall-effect devices comprising a rotor which generates a constant magnetic flux, stator poles for driving the said rotor, driving coils wound about the said stator poles, a large number of Hall-effect devices disposed about the periphery of the said rotor at substantially equal angular intervals, a stator core supporting the said Hall-effect devices, electrical connections such that the output terminals of the said Hall-effect devices are series-connected in succession so as to cause the outputs of all said Hall-effect devices generated by the said magnetic flux of the rotor to be all added in the same direction, and means to utilize the combined output so produced to control current passing through the said driving coils so as to create a rotational torque on the said rotor.

No references cited.

MILTON O. HIRSHFIELD, *Primary Examiner.*

D. X. SLINEY, *Assistant Examiner.*